Jan. 16, 1962 — K. W. HELMKE ETAL — 3,017,137
CONVERTIBLE AIRPLANE LOCKS
Filed Nov. 19, 1958 — 3 Sheets-Sheet 1

Kermit W. Helmke
William A. Klos
INVENTORS

BY *[signatures]*
Attorneys

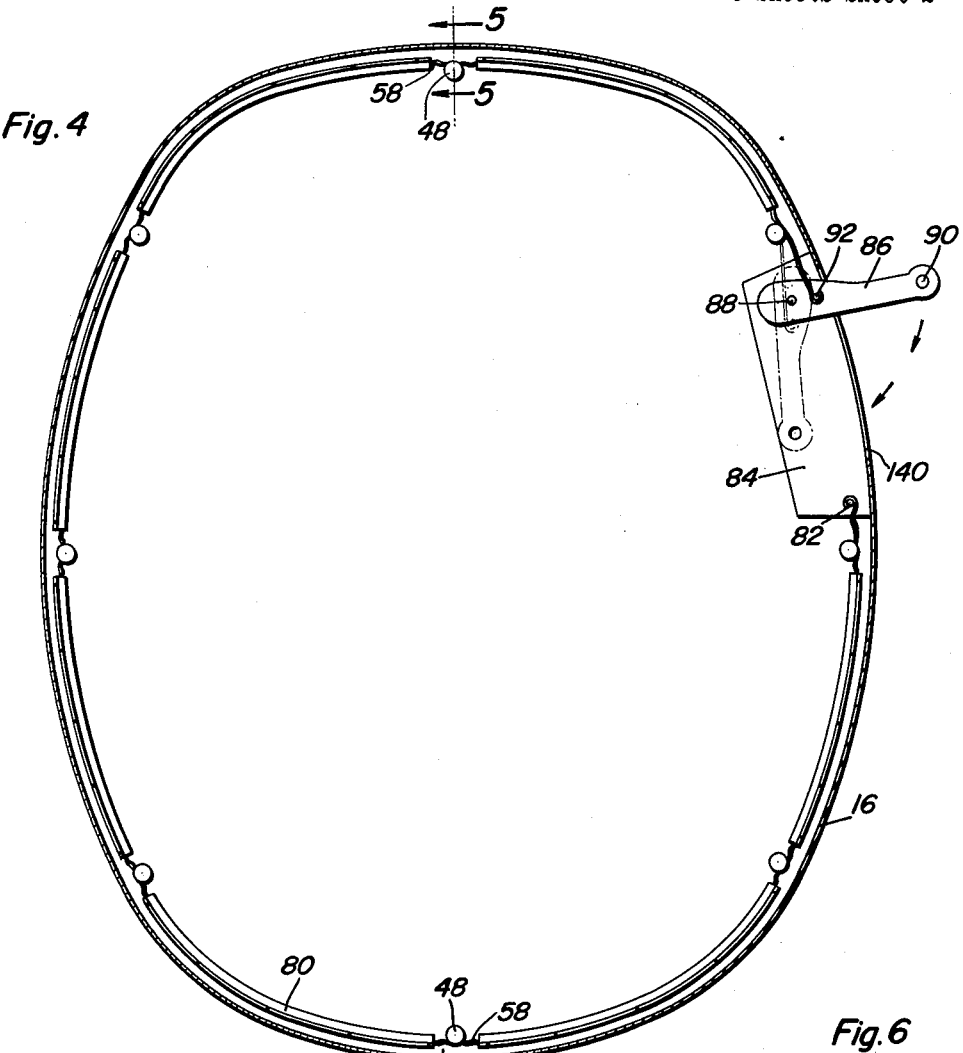
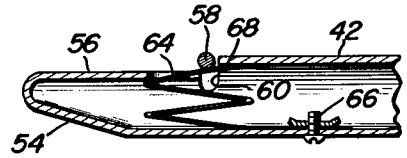
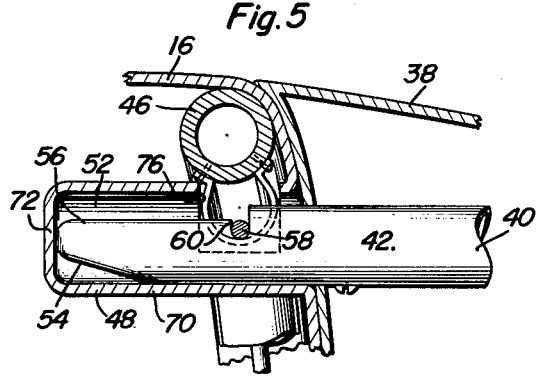

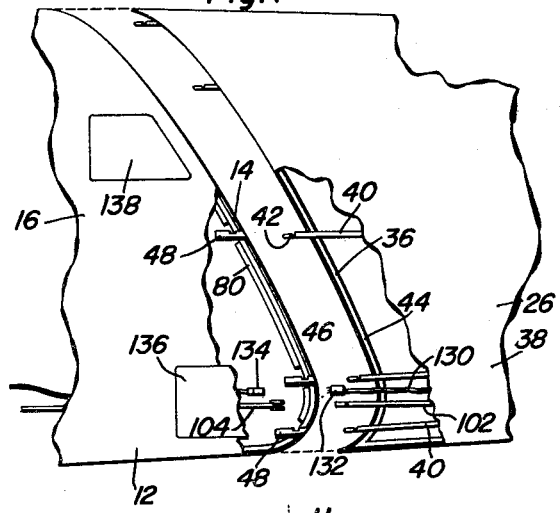
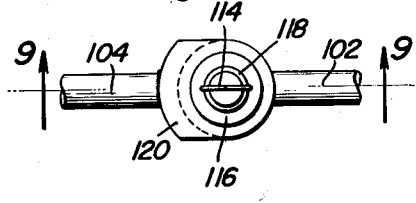
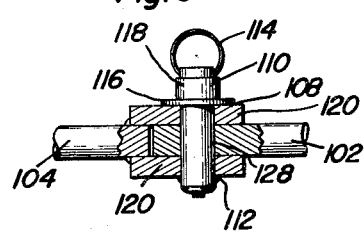
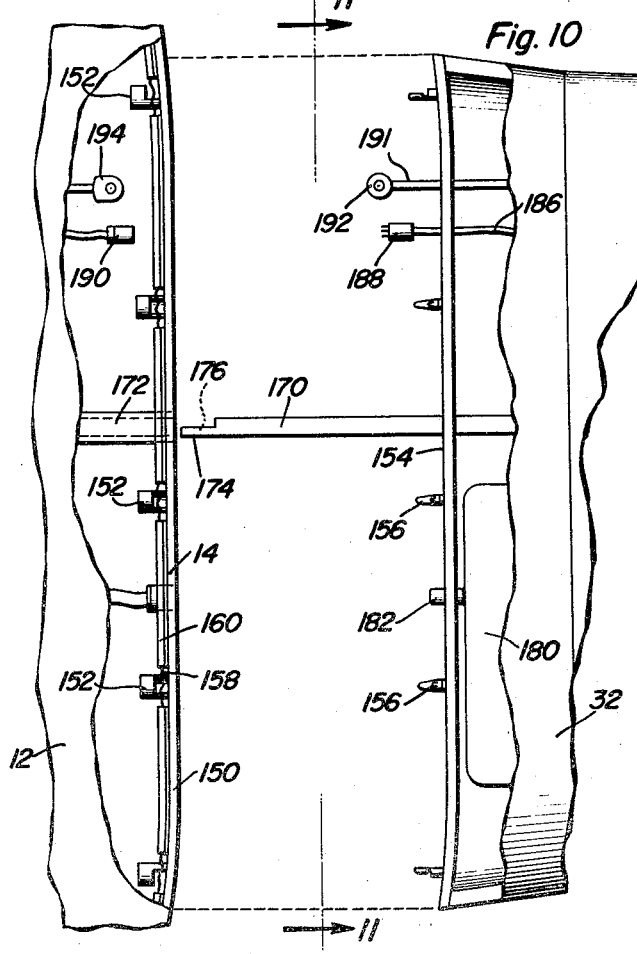
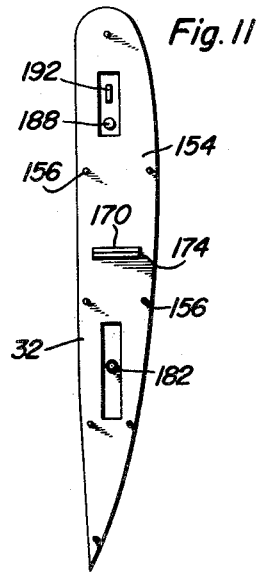
Kermit W. Helmke
William A. Klos
INVENTORS United States Patent Office 3,017,137
Patented Jan. 16, 1962

3,017,137
CONVERTIBLE AIRPLANE LOCKS
Kermit W. Helmke, 9th Tactical Reconnaissance Squadron, Shaw Air Force Base, S.C., and William A. Klos, 1926 Des Jardines, Houston, Tex.
Filed Nov. 19, 1958, Ser. No. 774,860
14 Claims. (Cl. 244—2)

This invention relates to vehicles that are convertible between airplanes and automobiles and more particularly to structures and techniques for separably connecting certain parts of the convertible vehicle tending to make such vehicles considerably more practical and useful.

A number of vehicles capable of converting between air and land travel have been described, and some have been constructed and successfully flown. Among the numerous problems confronting a manufacturer of such vehicles, is the problem of an easy practical way of attaching and detaching the empennage or tail section from the vehicle body. The same holds true for the wings. One approach is to leave the empennage in place and have the wings foldable alongside of the body or to another position with reference to the body. Such an arrangement is unsightly and impractical.

Another approach has been to have the wings and the tail section separably connected to the body. This invention provides means for separably connecting the tail section and wings to the body of the vehicle in such a manner that the wings and tail section are safely and securely held in place when on the vehicle body, but are very easily removed when the user of the vehicle wishes to convert from air travel to highway travel. In this way the invention solves a substantial difficulty encountered in the production of convertible aircraft.

In order to be practical the attaching and detaching procedure must be capable of being accomplished with a minimum of difficulty and if possible, with no tools or only the simplest type of tools. The nature of this invention achieves this by having a group of pins attached to the empennage section, a similar construction used for each wing, and a group of sockets formed by receptacles attached to the frame of the body of the vehicle. Although the positions of the pins and sockets may be exchanged, it is preferred that the sockets be attached to the body frame since there is a single operating lever required to lock the pins in the sockets, and this is better supported on the body frame.

Each pin has a laterally opening notch within which to accept a part of a single cable. The cable is constrained in its movement by being disposed in a cable housing that is secured to the frame of the body. Each socket has a slot, although a pair of openings would be a reasonable substitute, to accept the cable when it is placed under tension by operation of the lever. When the cable is tightened in this way it is pulled into the notches of the pins and being in the slots in the sockets, presents a short length of cable to the adjacent surfaces of the notches and slots thereby securely latching the pins in place in the sockets. With the very short lengths of cable located between the slot and notch surfaces, the cable is subjected to a shear stress should there be any tendency for shifting of the tail section (or wings) with respect to the body. The cable is exceedingly strong when used in this way and very securely attaches the pins in the sockets.

In order to release the tail section or wings, the only requirement is that the lever be operated in a proper direction thereby loosening the cable so that it will extend from its place occuping the various notches, thus freeing the tail section or wings so that they may be manually separated from the vehicle body.

Accordingly, an object of the invention is to provide a mechanically simple and functionally simple means for securely locking and releasing the tail section and wings from a vehicle body.

A more explicit object of the invention is to provide on the body and one of the removable parts of the vehicle, a group of sockets and a group of pins which fit into the sockets, and a single tension cable adapted to be drawn into laterally aligned notches and slots in the pins and sockets respectively by a single lever operation. Further, the cable is released by an equally simple lever operation but in the opposite direction.

Should it be found desirable, additional safety latches of a conventional, commercially available type may be used to supplement the holding action of the cable, pins and sockets. Further, the wings and tail section are ordinarily provided with control surfaces which must be operated from the cabin or cockpit of the vechile. Other necessary equipment is ordinarily carried by or in some other way connected with the wings and tail section. All of this equipment, including the control rods for the aerodynamic control surfaces are furnished with quick disconnect couplings at the juncture of the separable parts, that is the tail section and wings, of the vehicle and the vehicle body.

In order to have a practical vehicle which is convertible between highway use and air travel there are certain features that are required not only to comply with local and national regulations but also to improve the practicability of the vehicle. Since these are only incidental to the convertible airplane locks claimed herein, only a very few of them are incidentally shown and mentioned, for instance retractible wheels, license plate holders, retractible lamps and a detachable or otherwise adjustable propeller.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged sectional view taken on the line 4—4 of FIGURE 1.

FIGURE 5 is an enlarged sectional view showing one of the sockets and pins and a part of the locking cable therein and taken on the line 5—5 of FIGURE 4.

FIGURE 6 is an enlarged sectional view of one of the locking pins.

FIGURE 7 is a fragmentary elevational view, parts being broken away, the elevational view showing the tail section slightly separated from the vehicle body.

FIGURE 8 is a top view of a quick disconnect coupling in a part of the aerodynamic control surface operating rod.

FIGURE 9 is a sectional view taken on the line 9—9 of FIGURE 8.

FIGURE 10 is a fragmentary plan view, parts broken away, showing the root end of the wing slightly separated from the vehicle body.

FIGURE 11 is a view on reduced scale showing the end of one of the wings and taken approximately on the line 11—11 of FIGURE 10.

In the accompanying drawings there is shown a vehicle 10 which is convertible between air and highway, road, street, etc. travel. It is to be understood that the invention also contemplates an amphibious variation although the illustrations relate only to a vehicle for highway and air travel. Vehicle 10 has a vehicle body 12 functioning as the airplane fuselage or at least a part thereof and also functioning as the passenger compartment regardless of the medium through which or over which the vehicle is made to travel. Since the vehicle has an airplane nature, economy in weight is essential. Accordingly, body 12 is made of frame construction, having a frame 14 provided with a preferably metallic covering 16 held in place by usual manufacturing means and technique.

Figure 1:
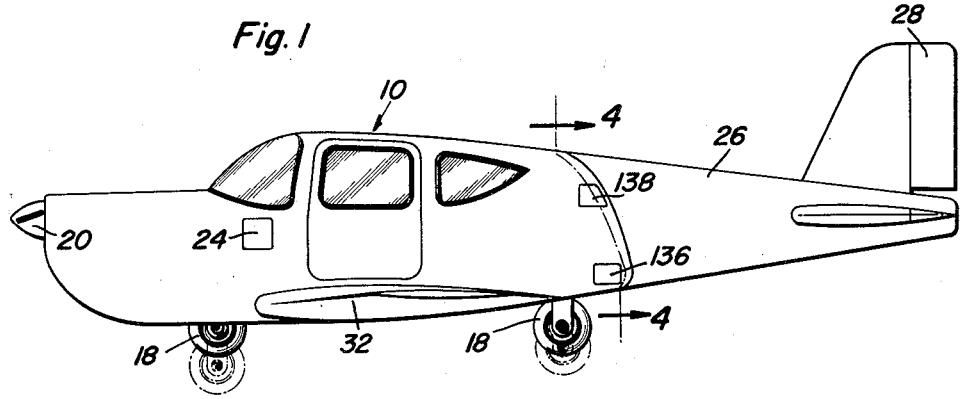
FIGURE 1 is a side view of a convertible vehicle constructed in accordance with the invention.
Figure 2:
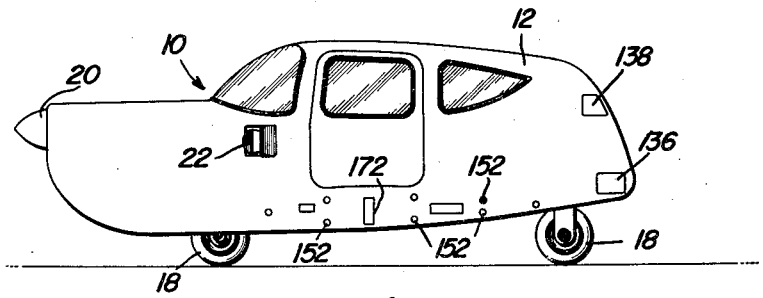
FIGURE 2 is a side view of the vehicle with the wings and tail section removed.
Figure 3:
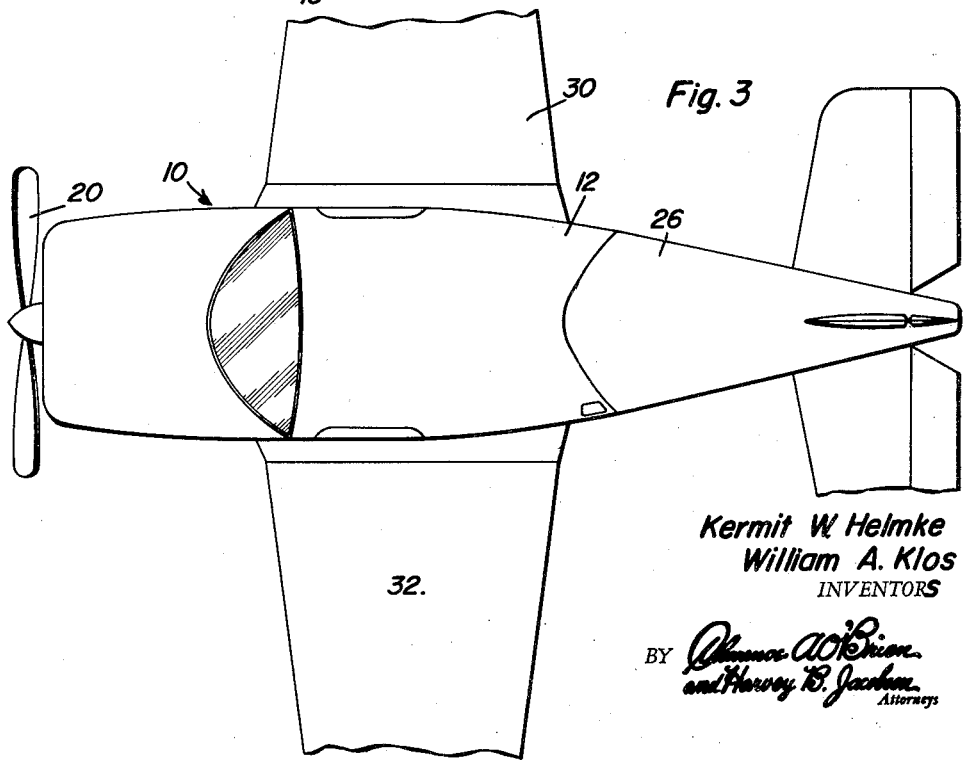
FIGURE 3 is a fragmentary top view of the vehicle in FIGURE 1.

As indicated previously the vehicle body is preferably equipped with features to have the vehicle practical for both air and highway travel. Among these features are the retractible wheels 18, separable or otherwise adjustable propeller 20, and retractible road and landing lights 22. The propeller need not necessarily be separable. It may be simply disconnected somewhere along its mechanical drive line with the vehicle engine and made to remain erect when the vehicle is used on the highway. The lights 22 are conveniently located and are mounted on hinges so that they are capable of moving to a recessed position (FIGURE 1) at which they are covered by panels 24, and movable to an open position to direct a beam of light forward of the vehicle.

Referring more particularly to the portions of the vehicle 10 with which the invention more directly deals, the vehicle body 12 is provided with an empennage or tail section 26 having aerodynamic control surfaces 28 which may include trim tabs and/or other parts. The vehicle body 12 is also equipped with wings 30 and 32 that are secured at the sides of the vehicle body below the vehicle doors. Here again, the wings are equipped with at least aerodynamic control surfaces and lights (not shown). Tail section 26 has a frame 36 and a covering 38 attached to the frame. The covering may be made of fabric or metal and is attached to the frame in the usual way. The inner ends of the longitudinal frame members 40 have locking pins 42 which are spaced in a particular pattern around the end frame member 44. The same pattern is duplicated on the end frame member 46 of vehicle body frame 14 however, the second pattern is made of a plurality of receptacles 48, each constituting a socket 52 to accommodate one locking pin 42 (FIGURE 5). The outer extremity of typical locking pin 42 (FIGURE 5) is smoothly curved to form a cam surface 54 thereby facilitating the entry of the group of pins into the group of sockets. A surface of pin 42 is stepped, there being step 56 formed by a reduced diameter part of the locking pin in order to provide clearance for the flexible elongate member, preferably cable 58 as the pin 42 enters typical socket 52. Further, there is a laterally opening locking notch 60 at the adjacent ends of the stepped parts of pin 42, and this notch is dimension to snugly accept cable 58 when the cable is adjusted to the pin locking position.

There are means for yieldingly opposing the penetration of cable 58 into notches 60 of the pins 42. These yielding means (FIGURE 6) may assume a number of configurations, one of the simplest being a spring 64 made of flat spring metal which is folded and located within the hollow pin 42. One end of the spring is secured to the tube, for instance by being spot welded, clipped or bolted as at 66. The opposite end of the spring has a flat surface 68 which occupies the space across notch 60, but which is capable of flexing inwardly in response to movement of cable 58 in a direction to enter notch 60. It is to be understood that the cable ejecting means made principally of spring 64, may be omitted with reliance on the normal action of the cable 58 spreading when it is released, but spring 64 or an equivalent assures that the cable 58 will be pushed from notch 60 sufficiently far to permit the locking pin 42 to be easily separated from a socket 52.

Socket 52 is a cylindrical receptacle having a side wall 70 and an end wall 72 to limit the penetration of pin 42. A laterally opening slot 76 is in the side wall 70 of receptacle 48 to provide clearance for the movement of cable 58. Each socket is preferably secured to the end frame member 46 so that it will remain in a fixed position, preserving a pattern which corresponds to the placement pattern of the locking pins 42.

Cable 58 is constrained by a plurality of three-quarter round cable guide housings 80 which are fastened to the end frame member 46 and which are located on opposite sides of the locking pin receiving sockets 52. One end of cable 58 is secured to an anchor 82 that is carried by mounting plate 84. The mounting plate is secured to the frame 14 of body 16 and has a cable operating lever 86 mounted by a single pivot 88. The lever has a locking pin hole 90 near one end to accept the pin that passes through an alined opening in mounting plate 84 to assure that the lever will remain in a fixed position after it has been adjusted to the position at which cable 58 engages the notches 60. Cable 58 is secured by an anchor 92 to lever 86 between pivot 88 and the outer extremity of the lever. Accordingly, when the lever is moved to the cable locking position, anchor 92 moves through an over-center position with respect to pivot 88 thereby forming a toggle action which automatically locks the cable in the notch 60 engaging position. The pin in hole 90 is merely a safety precautionary measure and the operation of this phase of the invention is now understandable. The tail section 26 is fitted against the rear part of body 12 with pins 42 penetrating the openings in sockets 52. Lever 86 is then swung to the cable tensioning position at which small parts of cable 58 move into notches 60 against the yielding opposition of springs 64. As a further safety measure several additional safety locks which operate in the nature of trunk latches, may be attached to frame members 46 and 44, respectively. One suggested arrangement would be to place four additional, manually operable safety latches which are essentially equally spaced around the frame members 44 and 46.

The convertible vehicle has provision for coupling and uncoupling other equipment in the tail section 26 and vehicle body. For instance a control rod shown in FIGURES 8 and 9 is made in sections 102 and 104 with a quick disconnect coupling 108 between the sections. The coupling 108 is composed of a pin 110 having detents 112 near one end and a pull ring 114 at the opposite end. A washer 116 fits under the head 118 of the locking pin and flush against one of the furcations 120 of the bifurcated end of section 104 (FIGURE 9). The furcations 120 have apertures that are adapted to aline with aperture 128 in the flattened end of section 102 thereby quickly and easily coupling and uncoupling the sections of control rod by placement and removal of pin 110. Electrical cable 130 has a pair of sections which are joined by plug and socket 132 and 134. Other connecting linkages or the like are separated in this way so that they may be connected and disconnected when attaching and detaching tail section 26 to the vehicle body. All parts which must be uncoupled and coupled are retained adjacent to each other so that they may be reached by opening hinged access door 136 in the body 12. A similar hinged access door 138 is in the body to cover opening 140 (FIGURE 4) behind which lever 86 is located.

Reference is now made principally to FIGURES 10 and 11 showing typical wing 32 slightly separated from body 12. One or more frame members 150 of frame 14 are provided with a plurality of receptacles which form sockets 152 that are identical in construction and function to sockets 52. The root end rib 154 or an additional rib at the root end of wing 32, has a group of locking pins 156 which are identical in construction and function to locking pins 42. Locking cable 158 which corresponds to cable 58, is constrained in its movement by cable guide housings 160 attached to frame member 150 and located between sockets 152. The cable 158 is adapted to enter notches in the locking pins 156 and is operable through slots in the sockets 152 in precisely the same manner as the locking structure shown in FIGURE 5.

Essentially the only difference between the locking of and the structure for connecting the wings to the body and that used for connecting tail section 26 to the body, is wing spar 170. The wing spar is extended so that it enters housing 172 attached to the frame 14 and having an open end to accept the wing spar extension 170. This may be an extension of the main spar of the wing, and it has a reduced end 174 provided with an opening 176 to receive a locking pin which is separable from the interior of the vehicle body. The reduced end 174 is made so that the reduced end of the corresponding wing spar or wing 30 may be superposed thereon with the same locking pin coupling both wing spars to the housing 172. Should it be found desirable, though, separate locking pins for the pair of wing spars may be furnished.

The fuel tank 180 is located in wing 32 and has a quick disconnect coupling 182 in the fuel line. Wing tip lights or other lights on the wings or other devices which are electrically operated, obtain current through cable 186 made in sections carried respectively by the body and the wing 32 and joined together by plug 188 and socket 190 at the confronting ends of the sections of the cable. Control rod 191 is made in sections with the ends of the sections having quick disconnect coupling parts 192 and 194 constructed identical to the couplings shown in FIGURES 8 and 9. Although a single control rod is illustrated, it is understood that multiple controls will require additional control structures. The attaching and removal of the wings insofar as the coupling and decoupling of rods, cables, fuel line, etc. is concerned is the same as that described in conjunction with the tail section. The functioning of the locks is precisely the same as that which has been described previously in connection with the tail section.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vehicle which is convertible between an airplane and an automobile, a body having a frame and a covering, wings, means detachably securing said wings to said body, a tail section, means separably securing said tail section to said body, at least one of said securing means including a plurality of sockets, a plurality of locking pins in said sockets, each locking pin having a notch, a cable, means for drawing said cable into the notch in each pin, and means for constraining the movement of said cable.

2. In a vehicle which is convertible between an airplane and an automobile, a body having a frame and a covering, wings, means detachably securing said wings to said body, a tail section, means separably securing said tail section to said body, at least one of said securing means including a plurality of sockets, a plurality of locking pins in said sockets, each locking pin having a notch, a cable, means for drawing said cable into the notch in each pin, means for constraining the movement of said cable, and resilient means connected with said pins to move said cable out of said notches when said cable is released.

3. An assembly to releasably fasten a vehicle section to the body of a vehicle wherein there is a vehicle body frame adjacent to a structure of the section, said assembly comprising a plurality of pins fixed to said structure, a plurality of sockets fixed to said frame and having openings to accept said pins when the section is attached to the body, said pins having laterally opening notches, said sockets having openings in the sides thereof, a flexible cable entrained through the openings in said sockets and engageable in said notches to lock said pins in said sockets, and means connected to said cable for drawing the cable into said pin notches.

4. An assembly to releasably fasten a vehicle section to the body of a vehicle wherein there is a vehicle body frame adjacent to a structure of the section, said assembly comprising a plurality of pins fixed to said structure, a plurality of sockets fixed to said frame and having openings to accept said pins when the section is attached to the body, said pins having laterally opening notches, said sockets having openings in the sides thereof, a flexible cable entrained through the openings in said sockets and engageable in said notches to lock said pins in said sockets, means connected to said cable for drawing the cable into said pin notches, and said cable drawing means including a lever pivoted to said frame and having one end of said cable attached thereto.

5. The assembly of claim 3, wherein there are resilient means connected with said pins for moving said cable out of said pin notches when said cable is released.

6. In a vehicle which is convertible between air and other travel, and wherein the vehicle has a body provided with separably mounted sections, the improvement comprising means for detachably locking at least one of said sections to said body, said means comprising a plurality of pins and a plurality of sockets, said pins and sockets arranged in similar patterns so that said pins may enter said sockets, said pins and sockets rigidly attached to the vehicle body and said section, means for simultaneously locking said pins in said sockets and for simultaneously unlocking said pins with respect to said sockets, and including a cable which is anchored at one end, a lever attached to the other end of said cable, said pins having notches with said cable located adjacent to said notches, and portions of said cable being drawn into said notches in response to movement of said lever in one direction.

7. The combination of claim 6, wherein there are means for retaining said lever in a position at which said cable is engaged in said notches.

8. The combination of claim 6, wherein there are means connected with said pins for yieldingly opposing the penetration of said cable portions into said notches and for urging said cable outwardly of said notches when said cable is released.

9. The combination of claim 6, wherein there are cable guides to constrain the movement of said cable and within which said cable is disposed.

10. The combination of claim 6, wherein said pins have cam surfaces at their ends to facilitate the entry of said pins into said sockets.

11. In a vehicle which is convertible between an airplane and an automobile, a body having a covered frame assembly, a wing assembly, means detachably securing said wing assembly to said body, a tail assembly, means separately securing said tail assembly to said body, at least one of said securing means including a plurality of spaced sockets secured to one of said assemblies, a plurality of spaced locking pins secured to an adjacent assembly and extending into said sockets and an elongated flexible member extending between each of said sockets and also connecting each of said sockets to its respective pin.

12. In a vehicle convertible between an airplane and an automobile and which has an engine supporting body provided with wheels, a pair of wing sections and a tail section, the improvement comprising means for separably securing one of said sections to said body, said means having a plurality of spaced pins, a plurality of sockets with said pins adapated to enter said sockets, means engaging said pins for simultaneously locking each pin in its socket, and a control rod having parts which are separable at the junction of the body and section and wherein said locking means includes a cable, and means to constrain the movement of said cable.

13. The combination recited in claim 12 wherein there are further separable connections for additional equipment provided at the juncture of said body and said section.

14. In a vehicle which is convertible between air and other travel, and wherein the vehicle has a body provided with separably mounted sections, the improvements comprising means for detachably locking at least one of said sections to said body, said means including a plurality of fixed pins and a plurality of sockets, said pins and sockets arranged in similar fixed patterns so that said pins may enter said sockets, said pins and sockets rigidly attached to the vehicle body and said section, and means engaging said pins for simultaneously locking all of said pins in said sockets and for simultaneously unlocking all of said pins with respect to said sockets, the engaging means being permanently secured adjacent said sockets and comprising an elongated flexible member extending between each adjacent socket.

References Cited in the file of this patent
UNITED STATES PATENTS

| | | |
|---|---|---|
| 1,180,967 | Billing | Apr. 25, 1916 |
| 1,635,347 | Rogginger | July 12, 1927 |
| 2,382,083 | Marohl | Aug. 14, 1945 |
| 2,430,869 | Fulton | Nov. 18, 1947 |
| 2,653,687 | Churchill | Sept. 29, 1953 |
| 2,736,523 | Chaplin | Feb. 28, 1956 |
| 2,818,272 | De Lay | Dec. 31, 1957 |